(12) United States Patent
Huang et al.

(10) Patent No.: US 9,535,775 B2
(45) Date of Patent: Jan. 3, 2017

(54) SESSION-BASED REMOTE MANAGEMENT SYSTEM AND LOAD BALANCE CONTROLLING METHOD

(71) Applicant: Industrial Technology Research Institute, Hsinchu (TW)

(72) Inventors: Kuo-Ming Huang, Tainan (TW); Kuen-Min Lee, Tainan (TW); Jin-Neng Wu, Tainan (TW); Ping-Yu Chen, Tainan (TW); Mu-Kai Huang, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 185 days.

(21) Appl. No.: 14/303,088

(22) Filed: Jun. 12, 2014

(65) Prior Publication Data
US 2015/0286519 A1    Oct. 8, 2015

(30) Foreign Application Priority Data

Apr. 3, 2014 (TW) .............................. 103112476 A

(51) Int. Cl.
*G06F 11/00* (2006.01)
*H04L 29/08* (2006.01)
(Continued)

(52) U.S. Cl.
CPC ......... *G06F 11/008* (2013.01); *G06F 11/0709* (2013.01); *G06F 11/0754* (2013.01);
(Continued)

(58) Field of Classification Search
CPC ...... G06F 9/505; G06F 9/5083; G06F 11/008; G06F 11/3006; G06F 11/3058; G06F 11/3433; H04L 67/1008; H04L 67/1012; H04L 67/1023; H04L 67/1025; H04L 67/1029; H04L 67/1034
See application file for complete search history.

(56) References Cited

U.S. PATENT DOCUMENTS 7,086,061 B1 *   8/2006   Joshi ................. H04L 29/12066
                                              718/105
7,240,117 B2 *   7/2007   Zatloukal ................ H04L 29/06
                                              370/229
(Continued)

FOREIGN PATENT DOCUMENTS

| CN | 102571782 A | 7/2012 |
|----|-------------|--------|
| TW | I400655 B   | 7/2013 |
| TW | I414161 B   | 11/2013 |

OTHER PUBLICATIONS

Rouse, Margaret; "Definition of server;" last updated in Jun. 2011. May 19, 2013 [http://whatis.techtarget.com/definition/server]. _Internet Archive Wayback Machine_. [https://web.archive.org/web/20130519065144/http://whatis.techtarget.com/definition/server].*

(Continued)

*Primary Examiner* — Joseph Kudirka
(74) *Attorney, Agent, or Firm* — Muncy, Geissler, Olds & Lowe, P.C.

(57) ABSTRACT

A session-based remote management system and a load balance controlling method are provided. The session-based remote management system includes a plurality of client servers, a load balancing server, a plurality of local databases, a shared database and a monitor server. The session-based remote management system is adapted for a plurality of clients coupling to a plurality of local databases and a shared database through a plurality of client servers. The load balance controlling method includes following steps. A computing performance of the clients and the client servers are analyzed. The clients are dispatched to the client servers based on the computing performance of the clients and the (Continued)

client servers. A crash probability of the client servers are dynamically predicted to obtain a health value.

15 Claims, 5 Drawing Sheets

(51) Int. Cl.
*H04L 29/14* (2006.01)
*G06F 11/07* (2006.01)
*G06F 11/14* (2006.01)

(52) U.S. Cl.
CPC ...... *H04L 67/1008* (2013.01); *H04L 67/1012* (2013.01); *H04L 67/1034* (2013.01); *H04L 69/40* (2013.01); *G06F 11/1446* (2013.01)

(56) References Cited

U.S. PATENT DOCUMENTS

| | | | |
|---|---|---|---|
| 7,716,077 B1 | 5/2010 | Mikurak | |
| 7,983,272 B2 | 7/2011 | Carlson et al. | |
| 8,125,897 B2 | 2/2012 | Ray et al. | |
| 8,130,793 B2 | 3/2012 | Edwards et al. | |
| 8,213,366 B2 | 7/2012 | Kozisek et al. | |
| 8,223,665 B2 | 7/2012 | Joo et al. | |
| 8,289,856 B2 | 10/2012 | Li et al. | |
| 8,401,859 B2 | 3/2013 | Dhawan et al. | |
| 8,521,571 B1* | 8/2013 | Fischer | G06Q 10/1093 705/7.11 |
| 8,539,080 B1* | 9/2013 | Uluderya | H04L 45/70 709/225 |
| 2002/0087612 A1* | 7/2002 | Harper | G06F 9/4856 718/100 |
| 2003/0177160 A1* | 9/2003 | Chiu | G06Q 10/06 718/100 |
| 2005/0033809 A1* | 2/2005 | McCarthy | H04L 67/1008 709/205 |
| 2009/0112809 A1* | 4/2009 | Wolff | G06F 11/008 |
| 2009/0328059 A1 | 12/2009 | Haba | |
| 2011/0276982 A1 | 11/2011 | Nakayama et al. | |
| 2012/0072781 A1* | 3/2012 | Kini | G06F 11/0766 714/47.3 |
| 2012/0166645 A1* | 6/2012 | Boldyrev | G06F 9/5083 709/226 |
| 2012/0198074 A1 | 8/2012 | Liaw | |
| 2012/0233313 A1 | 9/2012 | Fukami et al. | |
| 2014/0304352 A1* | 10/2014 | Chaudhary | H04L 67/1029 709/208 |

OTHER PUBLICATIONS

Pertet et al., "Causes of Failure in Web Applications (CMU-PDL-05-109)," CMU Parallel Data Library, http://repository.cmu.ed/pdl/48, pp. 1-20 (Dec. 2005).

Shen et al., "Session Initation Protocol (SIP) Server Overload Control: Design and Evaluation," http://arXiv.0807.1160v1, pp. 1-26 (Jul. 8, 2008).

Poggi et al., "Self-Adaptive Utility-Based Web Session Management," Elsevier, pp. 1-22 (Aug. 31, 2008).

Totok et al., "Modeling of current web sessions with bounded inconsistency in shared data," J. Parallel Distrib. Comput., vol. 67, pp. 830-847 (2007).

Huynh et al., "Empirical observations on the session timeout threshold," J. Info. Proc. & Manage., vol. 45. pp. 513-528 (2009).

Lufei et al., "e-Qos: Energy-aware ZoS for Application Sessions Across Multiple Protocol Domains in Mobile Computing," QShine '06, Waterloo, Ontario, Canada, pp. 1-9 (Aug. 2006).

Cavendish et al., "A Mean Value Analysis Approach to Transaction Performance Evaulation on Multi-Server Systems," IEEE, pp. 50-55 (Jan. 2009).

Gerofi et al., "An Efficient Process Live Migration Mechanism for Load Balanced Distributed Virtual Environments," 2010 IEEE Int'l Conf. on Cluster Comp., pp. 197-206 (2010).

Taniar et al., Computational Science and Its Applications—ICCSA 2010, Springer, Intl Conf., Japan, pp. 1-587 (Mar. 2010).

Kungumaraj et al., "Load Balancing as a Strategy Learning Task," J. of Theoret. & Appl. IT, pp. 90-95 (Mar. 15, 2012).

Vieira et al.: "Dynamic Content Web Applications: Crash, Failover and Recovery Analysis," Inst. De Computacao, Univ. Estadual de Campinas, pp. 1-21 (Dec. 2008).

* cited by examiner

… (1)

SESSION-BASED REMOTE MANAGEMENT SYSTEM AND LOAD BALANCE CONTROLLING METHOD

CROSS-REFERENCE TO RELATED APPLICATION

This application claims the priority benefits of Taiwan application serial no. 103112476, filed on Apr. 3, 2014. The entirety of each of the above-mentioned patent applications is hereby incorporated by reference herein and made a part of specification.

TECHNICAL FIELD

The disclosure relates to a session-based remote management system and load balance controlling method.

BACKGROUND

With the development of network technology, more and more clients need through a session-based remote management system to connect to the client servers to access large amounts of data sharing databases.

However, the adoption of a single shared database architecture is likely to cause network bottlenecks. And the load balancing server may not handle the sudden disconnection/crash situation.

And sudden disconnection/crash is the current situation can't handle the load balancing server. Furthermore, the system for load balancing and require frequent migration may cause an issue on convergence.

SUMMARY

An embodiment of the present disclosure provides a load balance controlling method in a session-based remote management system. The session-based remote management system is adapted for a plurality of clients coupling to a plurality of local databases and a shared database through a plurality of client servers. The load balance controlling method includes the steps of: analysing a computing performance of the plurality of clients and the plurality of client servers, dispatching the plurality of clients to the plurality of client servers based on the computing performance of the plurality of clients and the plurality of client servers, and predicting a crash probability of the plurality of client servers to obtain a health value dynamically.

An embodiment of the present disclosure provides a session-based remote management system. The session-based remote management system includes a plurality of client servers, a load balancing server, a plurality of local databases, a shared database and a monitor server. The load balancing server analyses a computing performance of a plurality of clients and a plurality of client servers, and dispatches the plurality of clients to the plurality of client servers based on the computing performance of the plurality of clients and the plurality of client servers. The plurality of local databases couple to the plurality of client servers respectively. The monitor server couples to the plurality of client servers and the shared database, and the monitor server dynamically predicts a crash probability of the plurality of client servers to obtain a health value.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
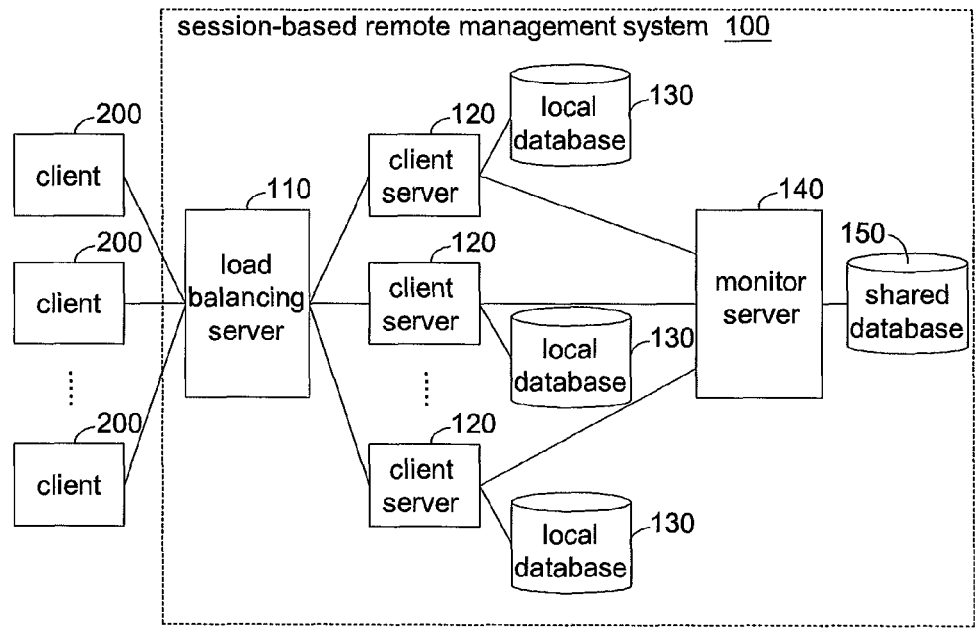
FIG. 1 is a schematic diagram of a session-based remote management system according to an embodiment of the disclosure.

FIG. 1 is a schematic diagram of a session-based remote management system 100 according to an embodiment of the disclosure. Referring to FIG. 1, in the present embodiment, the session-based remote management system 100 includes a load balancing server 110, a plurality of client servers 120, a plurality of local databases 130, a monitor server 140 and a shared database 150. The load balancing server 110 couples to the plurality of clients 200 to dispatch and manage the connection of the plurality of clients 200 to the plurality of client servers 120. Therefore, the session-based remote management system 100 adapts for a plurality of clients 200 coupling to the plurality of local databases 130 and the shared database 150 through the plurality of client servers 120. In the present embodiment, the load balancing server 110 is configured with static priority balancing mechanism to dispatch the plurality of clients 200 to the plurality of client servers 120 based on the computing performance of the plurality of clients 200 and the plurality of client servers 120. So the plurality of clients 200 and the plurality of client servers 120 have good configuration to balance the bottleneck of the unbalanced load.

The plurality of client servers 120 are dispatched by the load balancing server 110 and coupled to the plurality of clients 200. The client servers 120 provide clients 200 required large amounts of data from the local databases 130 or the shared database 150. The client servers 120 may also provide clients 200 extensive computing performance.

The plurality of local databases 130 are coupled to the plurality of client servers 120, and with the shared database 150, to form a hierarchical database architecture. The plurality of local databases 130 may share the loading of the shared database 150.

The monitor server 140 couples to the plurality of client servers 120 and the shared database 150. The monitor server 140 is configured with dynamic prediction mechanism. The monitor server 140 dynamically predicts a crash probability of the plurality of client servers 120.

In addition, the monitor server 140 further has dynamic system migration and backup mechanism. The monitor server 140 predicts when disconnection will occur and controls the client servers 120 for clients 200 migration and the data backup using the local databases 130 and the shared database 150.

The shared database 150 couples to the monitor server 140. The shared database 150 provides the plurality of clients 200 required large amounts of data.

As mentioned above, the session-based remote management system 100 is configured with static priority balancing mechanism, hierarchical database architecture, dynamic prediction mechanism and dynamic system migration backup mechanism. Static priority balancing mechanism and hierarchical database architecture may avoid load imbalance bottleneck. Dynamic prediction mechanism may avoid bottlenecks caused by sudden disconnection which that the system can't be processed. Dynamic system migration backup mechanism may avoid bottlenecks in the system migration convergence.

Figure 2:
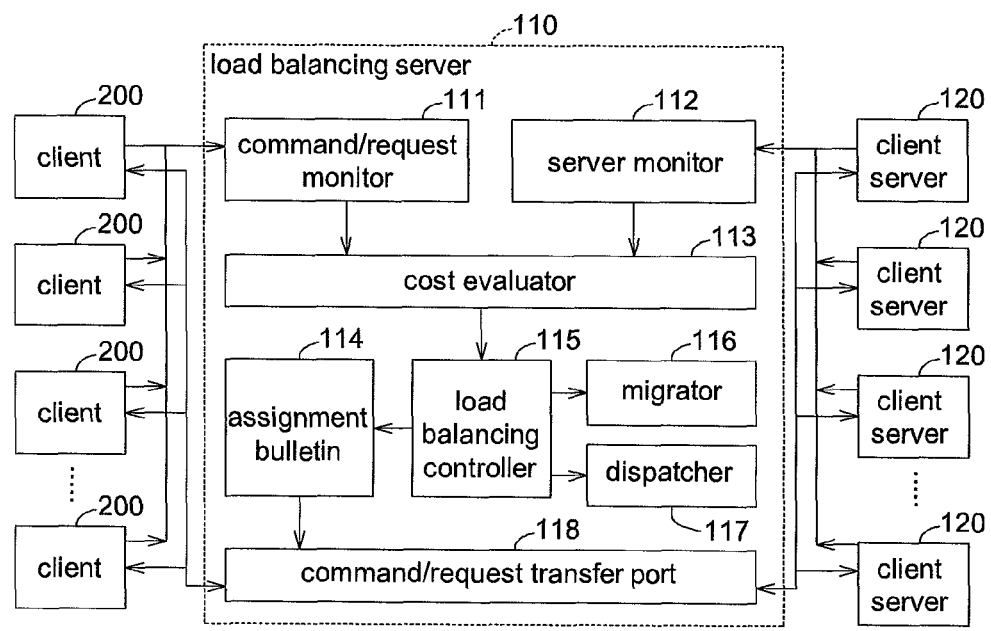
FIG. 2 is a schematic diagram of a load balancing server according to an embodiment of the disclosure.

FIG. 2 is a schematic diagram of a load balancing server 110 according to an embodiment of the disclosure. Referring to FIG. 2, in the present embodiment, the load balancing server 110 includes a command/request monitor 111, a server monitor 112, a cost evaluator 113, an assignment bulletin 114, a load balancing controller 115, a migrator 116, a dispatcher 117 and a command/request transfer port 118.

The command/request monitor 111 is adapted to monitor each command/request response time and the status of implementation. The server monitor 112 is adapted to monitor the loading of each of the client servers 120, including the implementation status of a processor, a memory and a connection port. The cost evaluator 113 is adapted to evaluate the performance of the plurality of plurality of client servers 120 and the priority of the plurality of clients 200 performing the commands/requests. The assignment bulletin 114 records the dispatched relationship of the clients 200 and the client servers 120. The load balancing controller 115 dynamically determines the dispatched relationship of the clients 200 and the client servers 120 according to a load balancing rules. The migrator 116 dynamically migrates each of the clients 200 when the session-based remote management system 100 needs migration. The dispatcher 117 is adapted to dispatch each of the clients 200 to each of the client servers 120. The command/request transfer port 118 transmits or receives each command/request to each of the clients 200.

In one embodiment, the command/request monitor 111, the server monitor 112, the cost evaluator 113, the assignment bulletin 114, the load balancing controller 115, the migrator 116, the dispatcher 117 and the command/request transfer port 118 composed of logic circuit components, and can be used to respectively execute the aforementioned functions. Moreover, these circuits can also be implemented by software programs or firmware programs stored in the hard disc or memory of a computer host. For example, in an embodiment, the software programs or firmware programs used for implementing the aforementioned functions are loaded into the processor of the computer host to respectively execute the aforementioned functions.

Figure 3:
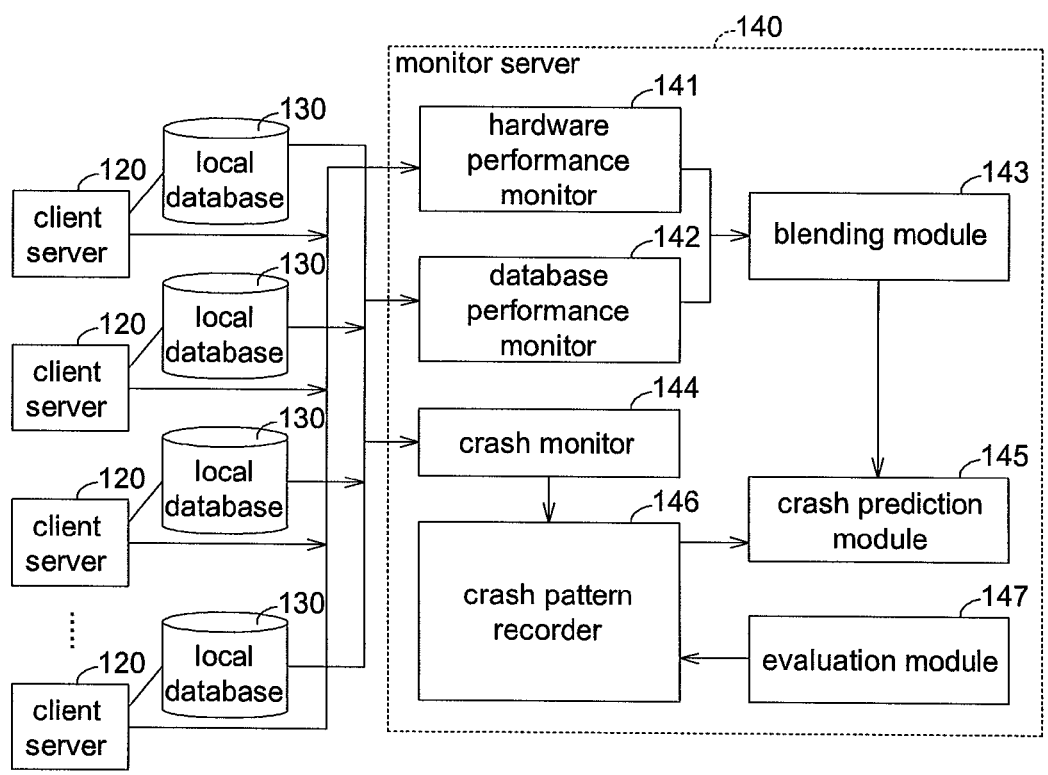
FIG. 3 is a schematic diagram of a monitor server according to an embodiment of the disclosure.

FIG. 3 is a schematic diagram of a monitor server 140 according to an embodiment of the disclosure. Referring to FIG. 3, in the present embodiment, the monitor server 140 includes a hardware performance monitor 141, a database performance monitor 142, a blending module 143, a crash monitor 144, a crash prediction module 145, a crash pattern recorder 146 and an evaluation module 147.

The hardware performance monitor 141 monitors the hardware performance of each of the client servers 120, such as the performance a processor or the performance of a memory. The database performance monitor 142 monitors the connection performance of the local databases 130 coupled to the client servers 120. The blending module 143 performs a regularization on the monitor information collected by the hardware performance monitor 141 and the database performance monitor 142 and generates the synthesis information (for example, a blending pattern). The crash monitor 144 monitors whether the disconnection event is occurred on each of the client servers 120. If the disconnection event occurs, the crash monitor 144 synthesizes various information and records the synthesis information in the crash pattern table (CPT). The crash prediction module 145 is for dynamically predicting the crash probability of the plurality of client servers 120 based on the regularized monitoring information. The crash pattern recorder 146 records the synthesis information of disconnection events occurred. The evaluation module 147 evaluates and revises a predicted probability value P of each disconnection event.

In one embodiment, the hardware performance monitor 141, the database performance monitor 142, the blending module 143, the crash monitor 144, the crash prediction module 145, the crash pattern recorder 146 and the evaluation module 147 composed of logic circuit components, and can be used to respectively execute the aforementioned functions. Moreover, these circuits can also be implemented by software programs or firmware programs stored in the hard disc or memory of a computer host. For example, in an embodiment, the software programs or firmware programs used for implementing the aforementioned functions are loaded into the processor of the computer host to respectively execute the aforementioned functions.

Figure 4:
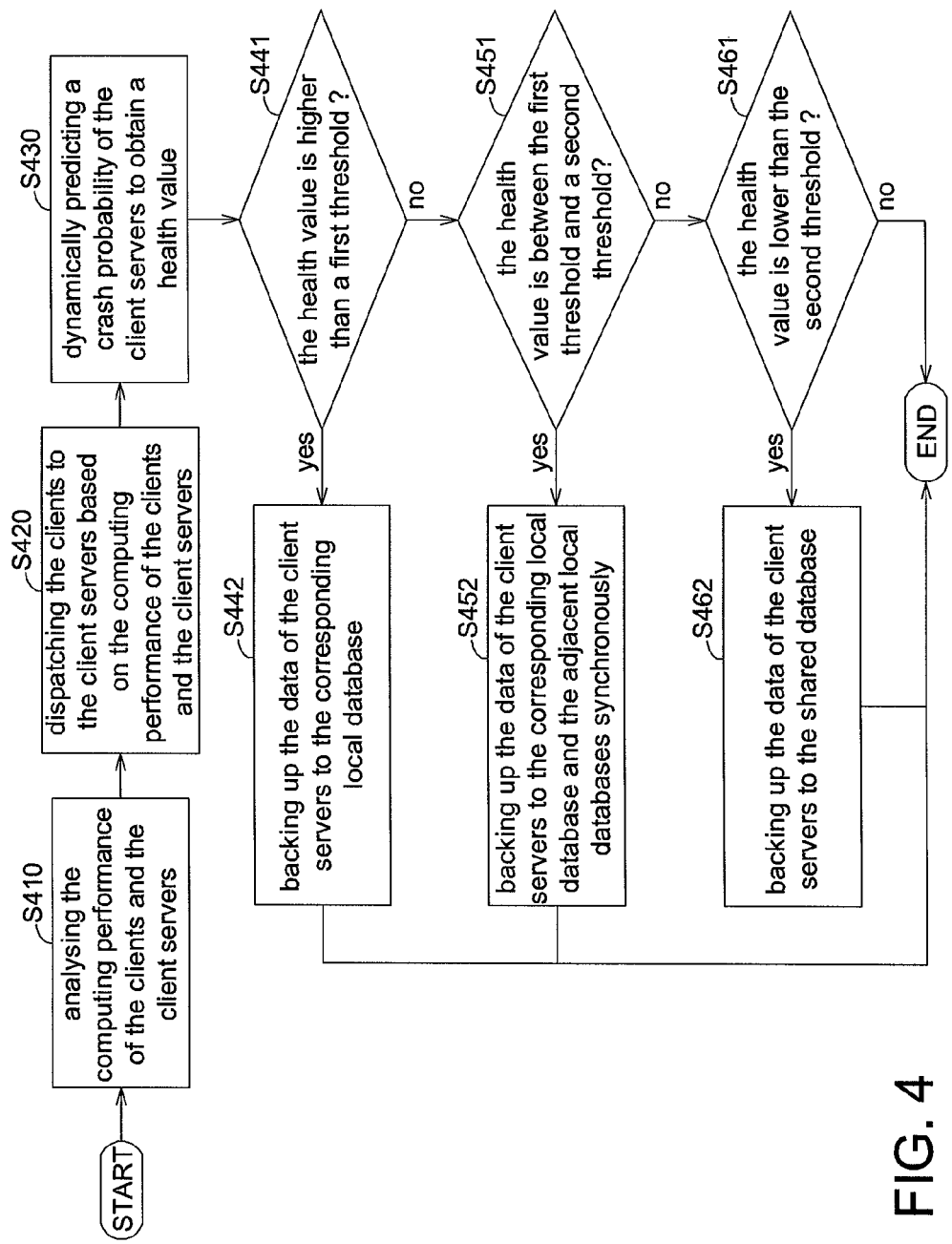
FIG. 4 is a schematic flowchart of a load balance controlling method in a session-based remote management system according to an embodiment of the disclosure.

FIG. 4 is a schematic flowchart of a load balance controlling method in a session-based remote management system 100 according to an embodiment of the disclosure. Please see the following flow chart for a detailed description of the session-based remote management system 100. The session-based remote management system 100 is configured with static priority balancing mechanism, hierarchical database architecture, dynamic prediction mechanism and dynamic system migration backup mechanism for controlling loading balance.

In step S410, the command/request monitor 111 and the server monitor 112 of the load balancing server 110 analysize the computing performance of the plurality of clients 200 and the plurality of client servers 120.

In step S420, the cost evaluator 113, the assignment bulletin 114 and load balancing controller 115 of the load balancing server 110 dispatch the plurality of clients 200 to the plurality of client servers 120 based on the computing performance of clients 200 and the client servers 120. In step S420, the load balancing server 110 implements static priority balancing mechanism via steps described below, which is not limited by the disclosure. For example, the load balancing server 110 applies the First Come First Served (FCFS) algorithm to implement static priority balancing mechanism, but the present disclosure is not limited thereto. First, the load balancing server 110 preliminary evaluates the specifications and the computing performance of each of the clients 200 and each of the client servers 120. Subsequently, a number of clients 200 (e.g., 1000 clients 200 whose number is labelled 1 to 1000) are sequentially dispatched to the client servers 120. When one client 200 is unregistered, the balance of the unregistered client 200 will be vacated by the last one client 200, and so it will be able to achieve load balancing.

In step S430, the monitor server 140 dynamically predicts a crash probability of the plurality of client servers 120 to obtain a health value.

In step S441, the monitor server 140 determines whether the health value is higher than a first threshold. If the health value is higher than the first threshold, then the method proceeds to step S442; otherwise, the method proceeds to step S451.

In step S442, the load balancing server 110 only backs up the data of each of the client servers 120 to the corresponding local database 130.

In step S451, the monitor server 140 determines whether the health value is between the first threshold and a second threshold, wherein the first threshold is higher than the second threshold. If the health value is between the first threshold and the second threshold, then the method proceeds to step S452; otherwise, the method proceeds to step S461.

In step S452, the load balancing server 110 backs up the data of each of the client servers 120 to the corresponding local database 130 and the adjacent local databases 130 synchronously.

In step S461, the monitor server 140 determines whether the health value is lower than the second threshold. If the health value is lower than the second threshold, then the method proceeds to step S462; otherwise, the end the process.

In step S462, the load balancing server 110 backs up the data of the plurality of client servers 120 to the shared database 150.

As mentioned above, the session-based remote management system 100 may operates at the beginning (i.e. step 410 and step 420) via static priority balancing mechanism and hierarchical database architecture.

In step S430, the session-based remote management system 100 may operates via dynamic prediction mechanism.

In steps S441, S442, S451, S452, S461 and S462, the session-based remote management system 100 may dynamically migrate and back up data based on the predicted result of the system stability. And the method is not limited to the order in which the steps are performed, for example, after the step S430, the method proceeds to step S451. When the session-based remote management system 100 is stable, no backup mechanism is taken (i.e. step 442). When the session-based remote management system 100 is not very stable, the data is backed up to the adjacent local databases 130 (i.e. step 452). When the session-based remote management system 100 is unstable, the data is fully backed up to the shared database 150 (i.e. step 462).

Figure 5:
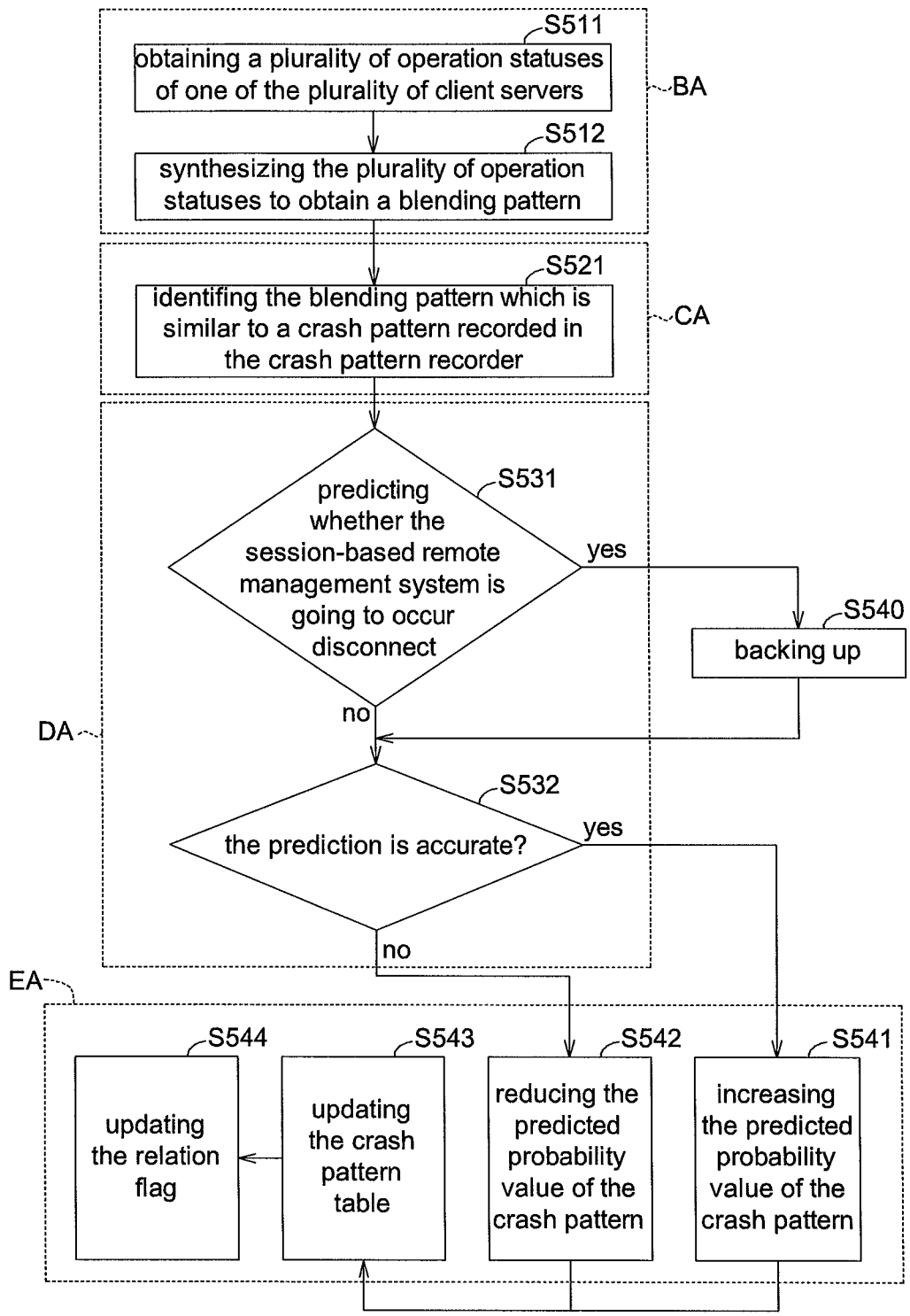
FIG. 5 is a schematic flowchart of the step S430 in the embodiment of FIG. 4.

FIG. 5 is a schematic flowchart of the step S430 in the embodiment of FIG. 4. Dynamic prediction mechanism of step S430 is performed according to Self-Learning Predictor Algorithm (SLPA).

Self-Learning Predictor Algorithm (SLPA) contains the following four portions: the blending algorithm (BA) of steps S511 and S512, the checking algorithm (CA) of step S511, the detecting algorithm (DA) of steps S531 and S532, and the estimating algorithm (EA) of steps S541 to S544.

Figure 6:
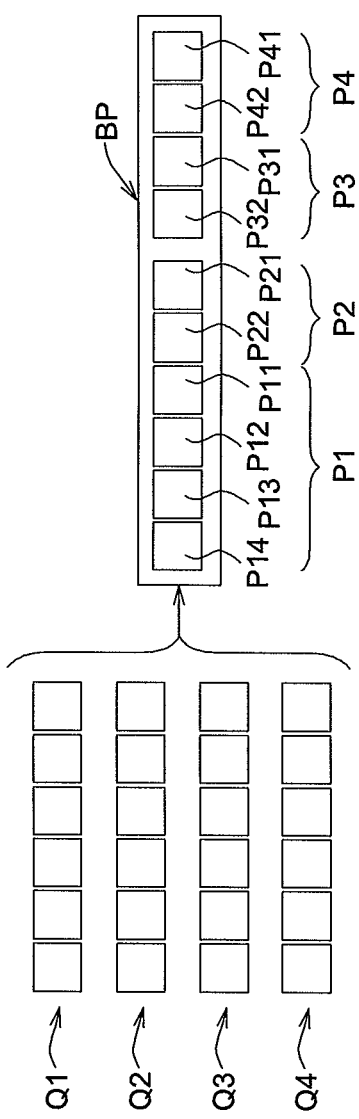
FIG. 6 is a schematic diagram illustrating blending pattern according to an embodiment of the disclosure.

FIG. 6 is a schematic diagram illustrating blending pattern (BP) according to an embodiment of the disclosure. Referring to FIG. 5 and FIG. 6, in step S511 of the present embodiment, the hardware performance monitor 141 and the database performance monitor 142 obtain a plurality of operation statuses Q1, Q2, Q3, Q4 of one of the plurality of client servers 120. For example, the operation statuses comprise an executing software object, a loading of a processor, a loading of a memory or an access time of network. In another embodiment, the operation statuses can be a temperature or a number of network accesses.

In step S512, the blending module 143 synthesizes the plurality of operation statuses Q1, Q2, Q3, Q4 to obtain a blending pattern (BP). In step S512, the operation statuses Q1, Q2, Q3, Q4 are changed to the operation statuses P1, P2, P3, P4 whose length are reduced, in order to improve the matching speed and increase the ratio of the probability of successful matching. The operation status P1 has four state values P11, P12, P13, P14. The operation status P2 has two state values P21, P22. The operation status P3 has two state values P31, P32. The operation status P4 has two state values P41, P42.

In step S521, the crash prediction module 145 identifies whether the blending pattern (BP) is similar to a crash pattern (CP) recorded in the crash pattern recorder 146.

Figure 7:
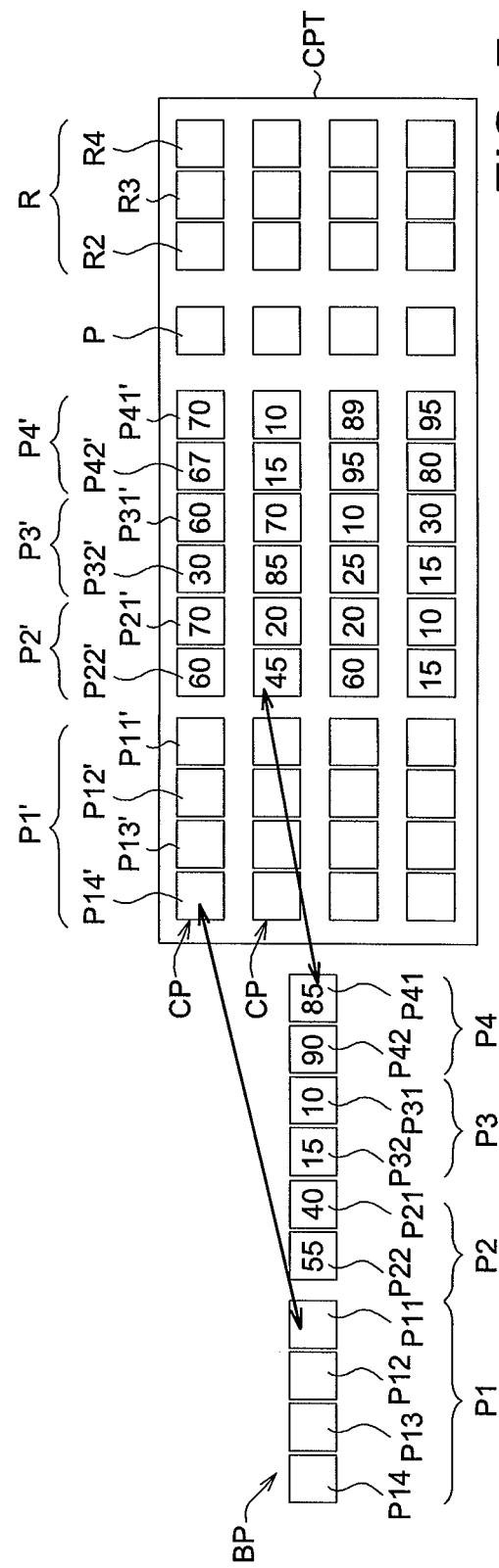
FIG. 7 is a schematic diagram illustrating the condition of matching of the crash pattern according to an embodiment of the disclosure.

FIG. 7 is a schematic diagram illustrating the condition of matching of the crash pattern (CP) according to an embodiment of the disclosure. Referring to FIG. 7, in the present embodiment, the crash pattern (CP) is the blending pattern (BP) when the client servers 120 actually occur disconnection. If the client servers 120 actually occur disconnection repeatedly, then a crash pattern table (CPT) records with multiple crash patterns (CP). Each of crash patterns (CP) records operation statuses P1', P2', P3', P4'. The operation status P1' has four state values P11', P12', P13', P14'. The operation status P2' has two state values P21', P22'. The operation status P3' has two state values P31', P32'. The operation status P4' has two state values P41', P42'.

The predicted probability value P is the probability of occurrence of possible disconnection (i.e. the crash probability) when the blending pattern (BP) is similar to the crash pattern (CP). The flag values R2, R3, R4 of the relation flag R respectively record the relationship of the operation statuses P2', P3', P4' and disconnection. If the flag value R2, R3 or R4 equals to 1, it means that the operation statuses and disconnection are related. If the flag value R2, R3 or R4 equal to 0, it means that the operation statuses and disconnection are not related.

In the identifying process, first, whether the operation status P1 of the blending pattern (BP) is similar to the operation status P1' of the crash pattern (CP) is identified. In the present embodiment, whether the state value P11 is identical to the state value P11' is identified first. If the state value P11 is the same as the state value P11', then a higher initial scores is given; otherwise, a lower initial scores is given. Then, whether the state value P12 is identical to the state value P12' is identified next. If the state value P12 is the same as the state value P12', then the scores is cumulated up; otherwise, whether the state value P13 is identical to the state value P13' is identified. The identifying process is performed continuously until all state values P11, P12, P13, P14 is identified with the operation status P1'. If the cumulative scores is higher than a threshold, it means the operation status P1 of the blending pattern (BP) is similar to the operation status P1' of the crash pattern (CP).

If the operation status P1 of the blending pattern (BP) is similar to the operation status P1' of a crash pattern (CP), then, further applies the weighted Manhattan distance algorithm to identify whether operation statuses P2, P3, P4 of the blending pattern (BP) are similar to the operation statuses P2', P3', P4' of the crash pattern (CP). For example, the calculation of the weighted Manhattan distance d can be determined by the following equation (1):

$$d = \sum_{all\ i} \left( \frac{Ri}{\sum_{all\ i} Ri} \right) \left( \sum_{all\ j} P_{max} - |Pij' - Pij| \right) \quad (1)$$

wherein i and j are integers.

If the weighted Manhattan distance d is smaller than a threshold, it means the blending pattern (BP) is similar to the crash pattern (CP).

During the operation of the session-based remote management system 100, the blending patterns (BP) will be continuously generated, and each blending pattern (BP) will be identified through the above steps until one blending pattern (BP) which is similar to the crash pattern (CP) in the crash pattern table (CPT) is found. It means the session-based remote management system 100 is going to occur disconnect.

In step S531, whether the session-based remote management system 100 is going to occur disconnect is predicted. If the blending pattern (BP) is similar to the crash pattern (CP), then the crash probability of the client servers 120 is generated based on the predicted probability value P of the crash pattern (CP). And in this step, a random number between 0 and 1 is generated. If the random number is less than or equal to the crash probability, then it is predicted that the session-based remote management system 100 is going to occur disconnect. Then the method proceeds to step S540 for backup. If the random number is larger than the crash probability, then it is predicted that the session-based remote management system 100 is not going to occur disconnect, and the method proceeds to step S532.

In step S532, the crash monitor 144 monitors the disconnection of each of the client servers 120 to get the accuracy of prediction, and then the predicted probability value is revised based on the accuracy of prediction. If the prediction is correct, then the method proceeds to step S541; otherwise, the method proceeds to step S542.

In step S541, the evaluation module 147 increases the predicted probability value P of the crash pattern (CP). In step S542, the evaluation module 147 reduces the predicted probability value P of the crash pattern (CP).

After steps S541 and S542, the method proceeds to step S543. In step S543, the evaluation module 147 updates the crash pattern table (CPT). For example, when the predicted probability value P is too low, the crash pattern (CP) is deleted from the crash pattern table (CPT). Then, the method proceeds to step S544. In step S544, the monitor server 140 updates the relation flag R. For example, the two disconnection conditions are compared. If the difference between the operation status P2' of the two disconnection conditions is too large, it means the disconnection condition has no relationship with the operation status P2' and the flag value R2 will be set to 0. If the difference between the operation status P3' of the two disconnection conditions is too large, it means the disconnection condition has no relationship with the operation status P3' and the flag value R3 will be set to 0. If the difference between the operation status P4' of the two disconnection conditions is too large, it means the disconnection condition has no relationship with the operation status P4', and the flag value R4 will be set to 0.

Through the learning steps above, the monitor server 140 constantly revises the content of the crash pattern table (CPT), so it may increase the success rate of the disconnection prediction.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A load balance controlling method in a session-based remote management system, the session-based remote management system adapted for a plurality of clients coupling to a plurality of local databases and a shared database through a plurality of client servers, the load balance controlling method comprising:
   analyzing a computing performance of the plurality of clients and the plurality of client servers;
   dispatching the plurality of clients to the plurality of client servers based on the computing performance of the plurality of clients and the plurality of client servers;
   predicting a crash probability of the plurality of client servers to obtain a health value dynamically; and
   backing up data of each of the client servers to a corresponding one of the plurality of local databases if the health value is higher than a first threshold.

2. The load balance controlling method as claimed in claim 1, further comprising:
   backing up data of each of the client servers to a corresponding one of the plurality of local databases and adjacent local databases synchronously if the health value is between the first threshold and a second threshold,
   wherein the first threshold is higher than the second threshold.

3. The load balance controlling method as claimed in claim 2, further comprising:
   backing up data of the plurality of client servers to the shared database if the health value is lower than the second threshold.

4. The load balance controlling method as claimed in claim 1, wherein the step of predicting the crash probability of the plurality of client servers to obtain the health value comprises:
   synthesizing a plurality of operation statuses of one of the plurality of client servers to obtain a blending pattern;
   identifying whether the blending pattern is similar to a crash pattern; and
   generating the crash probability based on a predicted probability value of the crash pattern if the blending pattern is similar to the crash pattern.

5. The load balance controlling method as claimed in claim 4, wherein the step of predicting the crash probability of the plurality of client servers to obtain the health value further comprises:
   revising the predicted probability value based on an accuracy of prediction.

6. The load balance controlling method as claimed in claim 4, wherein the plurality of operation statuses comprise at least one of an executing software object, a loading of a processor, a loading of a memory, an access time of network, a temperature and a number of network accesses.

7. The load balance controlling method as claimed in claim 1, wherein the plurality of client servers are coupled to the plurality of local databases.

8. A session-based remote management system, comprising:
   a plurality of client servers;
   a load balancing server analyzing a computing performance of a plurality of clients and the plurality of client servers and dispatching the plurality of clients to the plurality of client servers based on the computing performance of the plurality of clients and the plurality of client servers;

a plurality of local databases coupled to the plurality of client servers respectively;

a shared database; and a monitor server coupled to the plurality of client servers and the shared database, wherein the monitor server dynamically predicts a crash probability of the plurality of client servers to obtain a health value, wherein the load balancing server backs up data of each of the client servers to a corresponding one of the plurality of local databases if the health value is higher than a first threshold.

9. The session-based remote management system as claimed in claim 8, wherein the load balancing server backs up data of each of the client servers to a corresponding one of the plurality of local databases and adjacent local databases synchronously if the health value is between the first threshold and a second threshold, wherein the first threshold is higher than the second threshold.

10. The session-based remote management system as claimed in claim 9, wherein the load balancing server backs up data of the plurality of client servers to the shared database if the health value is lower than the second threshold.

11. The session-based remote management system as claimed in claim 8, wherein the monitor server further comprises:
 a hardware performance monitor coupled to the plurality of client servers;
 a database performance monitor coupled to the plurality of local databases, the hardware performance monitor and the database performance monitor obtaining a plurality of operation statuses of one of the plurality of client servers;
 a blending module synthesizing the plurality of operation statuses to obtain a blending pattern;
 a crash pattern recorder recording at least one crash pattern; and
 a crash prediction module identifying whether the blending pattern is similar to the crash pattern; and generating the crash probability based on a predicted probability value of the crash pattern if the blending pattern is similar to the crash pattern.

12. The session-based remote management system as claimed in claim 11, wherein the monitor server further comprises:
 a crash monitor monitoring a crash to obtain an accuracy of prediction; and
 an evaluation module revising the predicted probability value based on the accuracy of prediction.

13. The session-based remote management system as claimed in claim 11, wherein the plurality of operation statuses comprise at least one of an executing software object, a loading of a processor, a loading of a memory, an access time of network, a temperature and a number of network accesses.

14. The session-based remote management system as claimed in claim 8, wherein the plurality of client servers are coupled to the plurality of local databases.

15. The session-based remote management system as claimed in claim 8, wherein the load balancing server further comprises:
 a command/request monitor;
 a server monitor, wherein the command/request monitor and the server monitor analyze the computing performance of the plurality of clients and the plurality of client servers;
 a cost evaluator;
 an assignment bulletin;
 a load balancing controller, wherein the cost evaluator, the assignment bulletin and the load balancing controller dispatch the plurality of clients to the plurality of client servers based on the computing performance of the plurality of clients and the plurality of client servers;
 a migrator dynamically migrating each of the plurality of clients when the session-based remote management system needs migration; and
 a command/request transfer port transmitting a plurality of commands/requests to the plurality of clients.

* * * * *